(No Model.) 2 Sheets—Sheet 1.

C. W. ELKINS & W. C. & S. FOREMAN.
FRUIT PITTING MACHINE.

No. 429,209. Patented June 3, 1890.

Witnesses,
J. H. Kruse
H. C. Lee.

Inventors,
Charles W. Elkins
William C. Foreman
Stanton Foreman
By Dewey & Co. attys.

(No Model.) 2 Sheets—Sheet 2.
C. W. ELKINS & W. C. & S. FOREMAN.
FRUIT PITTING MACHINE.
No. 429,209. Patented June 3, 1890.
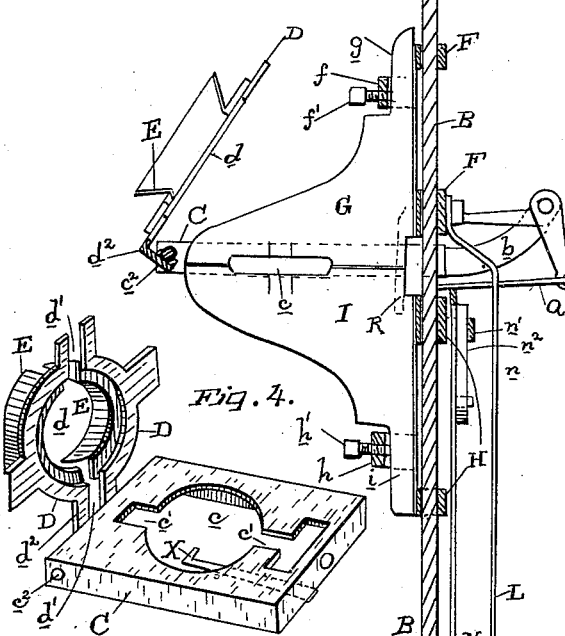
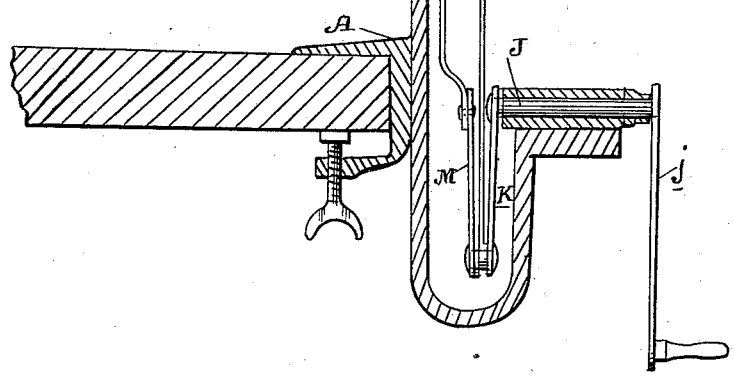
Witnesses,
J. H. Nourse
H. C. Lee.
Inventor,
Charles W. Elkins
William C. Foreman
Stanton Foreman
By Dewey & Co. attys

UNITED STATES PATENT OFFICE.

CHARLES W. ELKINS, OF PALERMO, AND WILLIAM C. FOREMAN AND STANTON FOREMAN, OF BIDWELL'S BAR, CALIFORNIA.

FRUIT-PITTING MACHINE.

SPECIFICATION forming part of Letters Patent No. 429,209, dated June 3, 1890.

Application filed October 16, 1889. Serial No. 327,223. (No model.)

*To all whom it may concern:*

Be it known that we, CHARLES W. ELKINS, a citizen of the United States, residing at Palermo, and WILLIAM C. FOREMAN and STANTON FOREMAN, citizens of the United States, residing at Bidwell's Bar, all in Butte county, State of California, have invented an Improvement in Fruit-Pitting Machines; and we hereby declare the following to be a full, clear, and exact description of the same.

Our invention relates to that class of fruit-pitting machines in which the fruit is caught between and cut by opposing reciprocating knives, the cut fruit being discharged automatically by a tilting or swinging bed; and our invention consists in the novel details of construction, arrangement, and combination hereinafter fully described, and specifically pointed out in the claims.

The object of our invention is to provide a simple and effective machine for stoning fruit, which does not require any manipulation of the fruit, the latter being fed to the knives automatically, cut in halves, and the pit and the halved fruit discharged separately and automatically, the whole operation being performed by a single crank movement.

Figure 1:
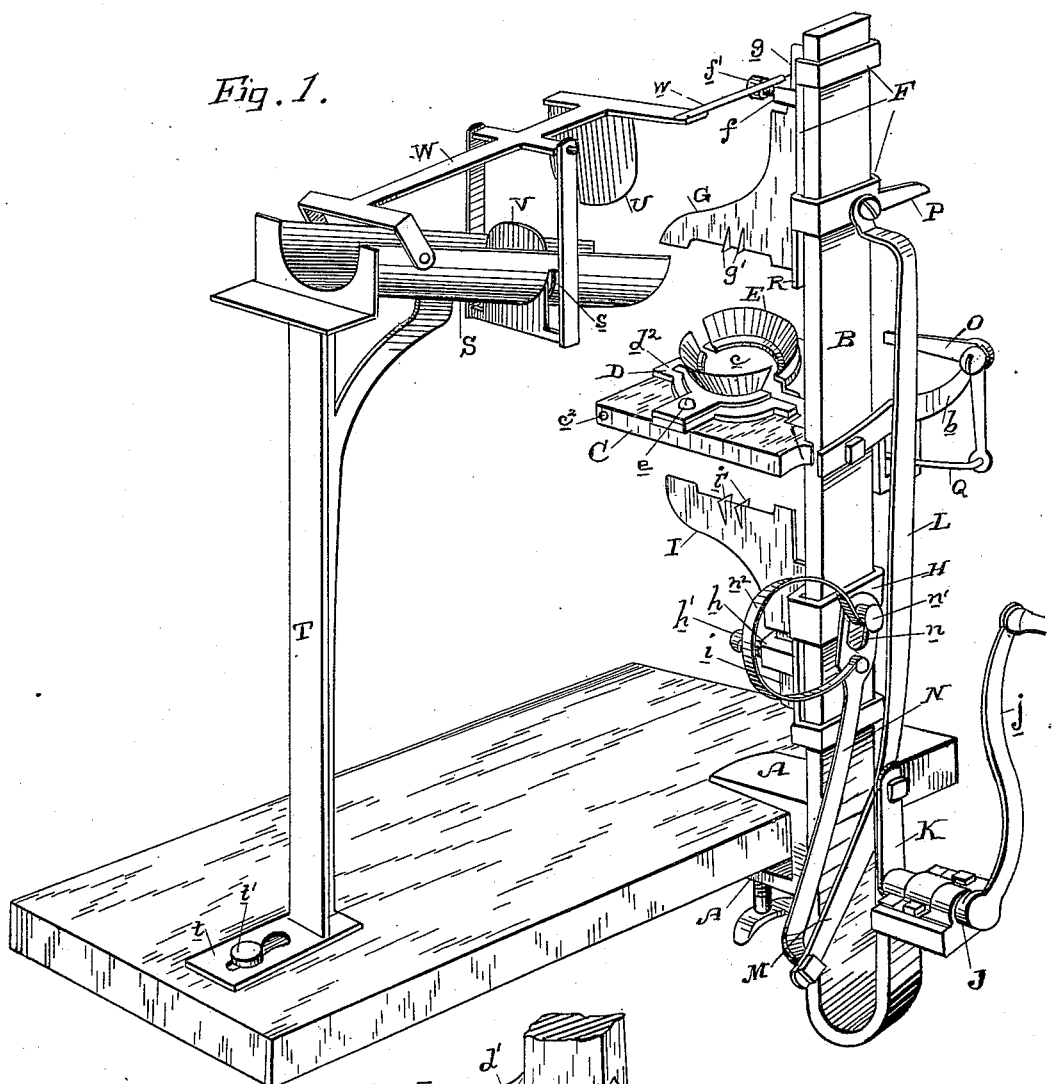
Figure 5:
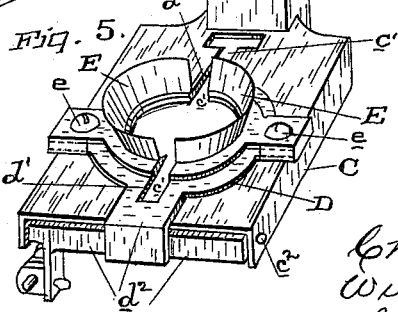

Referring to the accompanying drawings for a more complete explanation of our invention, Figure 1 is a perspective view of our machine. Fig. 2 is a vertical section of same from one side. Fig. 3 is an elevation from the other side. Fig. 4 is a detail of the bracket C and fruit-bed D, showing the latter tilted. Fig. 5 is a detail showing the fruit-bed down on the bracket.

A is the bed-plate of the machine, adapting it to be screwed to any suitable table or stand.

B is a standard secured to one edge of the bed-plate.

C is a bracket fixed to the standard and forming a platform or bearing for the fruit-bed D. The bracket has a central perforation or hole $c$ extended into end slits $c'$, and in the end of the bracket is a pintle $c^2$, on which is pivoted the shank $d^2$ of the fruit-bed D, whereby said bed may have a tilting or swinging movement about said pintle. The fruit-bed is also provided with a central hole or perforation $d$, terminating in end slits $d'$, corresponding to the hole and slits of the bracket.

Secured to the top of the fruit-bed—one on each side of its hole $d$—are the curved guides E, which are independent of each other, and are secured in place removably by means of screws $e$, whereby one pair may be readily replaced by a pair of different size to accommodate different fruits.

Mounted upon the upper portion of the standard B is a sliding carrier F, to the face of which is fitted the upper knife G, and mounted upon the lower portion of the standard is a sliding carrier H, having fitted to its face the lower knife I. Each of these knives is fitted adjustably to its carrier, their shanks $g$ and $i$ passing through guide-sockets $f$ and $h$ on the carriers and secured therein by set-screws $f'$ and $h'$, so that the knives may be readily set up or down to compensate for wear and to regulate and adjust their relative positions to different-sized pits. These knives are located in the vertical plane of the central holes and end slits of the bracket C and fruit-bed D and work through them. They extend across them, and each knife has a concave center of greater or less degree to conform to the shape of pits, and these centers are provided with short holding points or tines $g'$ and $i'$ at right angles, the object of which is to better engage and hold the pits, no matter in what position they may be presented and lie. To these knives are imparted oppositely-reciprocating movements by the following mechanism: The lower end of standard B is upturned to form a bearing for the shaft J, to the other end of which is attached a hand-crank $j$, though it is obvious a treadle-connection may be made, if desired.

To the inner end of the shaft J is secured a crank-arm K, from which a connecting-rod L extends to the upper knife-carrier F. To the end of crank-arm K is also attached a link-arm M, extending in an opposite direction at a slight angle, and from the end of this link-arm extends a connecting-rod N to the lower knife-carrier H. The connection between the upper end of the rod N and the lower knife-carrier is a sliding spring-controlled one, formed by providing the rod with an elongated slot $n$, which fits freely over a stud or pin $n'$, projecting from the knife-carrier, a curved spring $n^2$ being secured at one end to the stud or pin and at the other end to the rod. The reason of this connection is twofold, namely: First, it is rendered necessary from the relative positions of the crank-arms and their connecting-rods, which make the upper knife continue to descend even after contact with the lower knife and before the lower knife has begun to be pulled down positively, and therefore the lower knife yields under the direct pressure of the upper knife, and, second, it affords a strong grip of the knives on the pit as they carry it down through the openings in the fruit bed and bracket, this grip, being, however, a yielding one to accommodate different sizes of pits.

The fruit-bed D has imparted to it a tilting or swinging movement, as follows: Pivoted at its angle in an arm $b$, extending from standard B, is a bell-crank lever O, the upper arm of which lies directly under and is adapted to receive the contact of an arm P, extending from the upper knife-carrier F. To the lower arm of lever O is connected a rod Q, the other end of which is connected with a short crank $d^3$ of the shank $d^2$ of the fruit-bed D. A spring $q$ around rod Q returns it. Now, as the upper knife-carrier descends, its arm P, coming in contact with the upper arm of the bell-crank lever O, rocks said lever, thereby pulling back on rod Q and, through the crank $d^3$, swinging or tilting bed D. As the carrier rises, the spring $q$ returns the parts to position. The two knives are assisted in coming together in perfect alignment by a forked or slotted guide-stem R, projecting downwardly from the upper knife and adapted to fit over the lower knife when the two approach each other.

S is a feed-chute, the lower end of which is adapted to deliver the fruit into the space between the curved guides E. This chute is supported on a standard T, rising from the bed-plate A. It is controlled by two gates, the outer one being designated by U and the inner one by V. These are both carried by a swinging frame W, which is pivoted to the chute, the gate U coming down into and closing the end of the chute and the gate V playing upwardly in a slot $s$ in the chute and closing said chute when the outer gate is elevated. An arm $w$ projects forwardly from the front of the frame W and lies just above and in the path of the socket-bearing $f$ of the upper knife-carrier, whereby as said carrier ascends the frame is raised, thereby elevating its outer gate and closing the chute with its inner gate. As it descends, the frame drops by gravity, removing its inner gate and closing the chute with its outer gate. The position of the feed-chute with respect to the fruit-bed may be adjusted by setting its standard closer to or farther away, its foot $t$ being slotted for this purpose and receiving the screw $t'$. Under the bracket C is a small spring X, which comes in contact with the pit when forced down and assists in its discharge.

The operation of the machine is as follows: The fruit is delivered from the chute one at a time by the gates U and V, which are operated by the moving knife-carrier F. The fruit drops into the curved flanged guides E, which perfectly confine and hold it on the fruit-bed D. The hand-crank is now turned forwardly, and the two knives approach until, meeting the fruit, they cut into its flesh and grip the pit, their small tines holding it in any position. Further movement of the hand-crank still carries the upper knife down, and this presses, as before described, the lower knife down, so that the pit gripped between them is carried down through the perforated fruit-bed D and bracket C until clear of both, where it is discharged by the separation of the knives, the lower knife now leaving the upper one, and this discharge is assisted by the small spring X under bracket C, which, coming in contact with the loosened pit, flips it out. As the two knives pass down below the fruit-bed, the arm P of the upper knife-carrier, coming in contact with the bell-crank lever O, serves to swing or tilt the fruit-bed upwardly and outwardly, thereby throwing the halved fruit out into a suitable receptacle. Then, as the upper knife ascends, the bed returns and the outer gate of the chute feeds a second fruit to the bed.

Having thus described our invention, what we claim as new, and desire to secure by Letters Patent, is—

1. The combination, in a fruit-pitting machine, of a fixed standard, a perforated bed for the fruit carried thereby, the upper and lower carriers adjustably fitted and sliding on the standard, the knives secured to the carriers and operating through the perforated bed, and the mechanism for oppositely reciprocating the carriers, consisting of the crank-shaft mounted in an arm of the standard, the crank-arm K on the inner end of said shaft, and the connecting-rods between said arms and the carriers, substantially as herein described.

2. In a fruit-pitting machine, the combination, with a perforated fruit-bed and a support therefor, of the reciprocating upper knife, the oppositely-reciprocating lower knife, and a spring connected with the lower knife, whereby the latter may have an independent yielding movement, substantially as herein described.

3. The combination, in a fruit-pitting machine, of a fixed standard, a perforated fruit-bed carried thereby, the upper and lower carriers sliding on the standard, the knives secured to the carriers and operating through the perforated bed, the crank-shaft, the crank-arm K on its inner end and the rod connecting it with the upper carrier, the connecting rod or link M, the rod connected therewith and adjustably connected with the lower carrier, and the spring controlling the adjustable connection, whereby the lower carrier may yield, substantially as and for the purposes described.

4. In a fruit-pitting machine, the combination of a fixed standard, a perforated fruit-bed, the oppositely-reciprocating knives adapted to slide on said standard and operate through the fruit-bed, and a spring-arm secured to the under side of the fruit-bed, so that its free end will normally lie immediately below the fruit therein, substantially as described.

5. The combination, in a fruit-pitting machine, of the fixed standard, the platform or support, the perforated tilting fruit-bed supported by the platform, the sliding carriers on the standard, the knives secured to the carrier, and the means for tilting the fruit-bed, consisting of the pivoted bell-crank lever, the arm on the upper knife-carrier for operating it, the spring-controlled rod connected with the bell-crank lever, and the crank at the pivotal center of the fruit-bed and connected with the rod, substantially as herein described.

6. The combination, in a fruit-pitting machine, of the fixed standard, the perforated bracket carried thereby, the perforated tilting fruit-bed hinged to the bracket, the upper and lower sliding carriers on the standard, the knives secured to the carriers and operating through the perforated fruit-bed and bracket, the crank-shaft, the crank-arms thereon, and the connecting-rods between said arms and carriers, the pivoted bell-crank lever, the arm of the upper carrier for operating said lever, the crank on the pivotal center of the fruit-bed, and the spring-controlled rod connecting said crank and bell-crank lever, substantially as herein described.

7. In a fruit-pitting machine, the combination of the fixed standard, the oppositely-reciprocating carriers adapted to slide thereon, knives adjustably secured to said carriers at right angles to the standard, and set-screws for securing the knives in position, substantially as described.

8. An improved fruit-pitting machine comprising a stationary standard, carriers mounted to slide thereon in opposite directions, and each provided with a knife, a fruit-bed, independent guides thereon for holding the fruit, a feed-chute, a swinging frame carried thereby, alternately-acting gates for controlling the chute, and an arm from the frame projecting in the path of the knife-carrier, whereby the gates are operated, substantially as described.

In witness whereof we have hereunto set our hands.

CHARLES W. ELKINS.
WILLIAM C. FOREMAN.
STANTON FOREMAN.

Witnesses:
JOHN C. GRAY,
E. A. MOUNT.